(12) United States Patent
Long et al.

(10) Patent No.: US 8,195,339 B2
(45) Date of Patent: Jun. 5, 2012

(54) SYSTEM AND METHOD FOR SCHEDULING STARTUP OF A COMBINED CYCLE POWER GENERATION SYSTEM

(75) Inventors: Christopher Eugene Long, Greer, SC (US); Daniel Holzhauer, Burnt Hills, NY (US); Ratna Manedhar Punjala, Andhra Pradesh (IN); Rohan Saraswat, Madhapur Hyderabad (IN); Fernando D'Amato, Niskayuna, NY (US); Susan Peterson, Loveland, CO (US); Luis Blasini, Loveland, CO (US)

(73) Assignee: General Electric Company, Schenectady, NY (US)

( * ) Notice: Subject to any disclaimer, the term of this patent is extended or adjusted under 35 U.S.C. 154(b) by 490 days.

(21) Appl. No.: 12/565,945

(22) Filed: Sep. 24, 2009

(65) Prior Publication Data

US 2011/0071692 A1  Mar. 24, 2011

(51) Int. Cl.
*G06F 19/00* (2011.01)
(52) U.S. Cl. ............. 700/291; 700/287; 60/646
(58) Field of Classification Search .......... 700/291, 700/287; 60/646; 415/13
See application file for complete search history.

(56) References Cited

U.S. PATENT DOCUMENTS

| | | | |
|---|---|---|---|
| 4,222,229 A | 9/1980 | Uram | |
| 5,042,246 A | 8/1991 | Moore et al. | |
| 6,370,880 B1 | 4/2002 | Smith et al. | |
| 6,745,109 B2 | 6/2004 | Kojima et al. | |
| 6,775,597 B1 | 8/2004 | Ristanovic et al. | |
| 6,795,798 B2 | 9/2004 | Eryurek et al. | |
| 6,925,338 B2 | 8/2005 | Eryurek et al. | |
| 7,050,866 B2 | 5/2006 | Martin et al. | |
| 7,054,706 B2 | 5/2006 | Kempf et al. | |
| 7,206,644 B2 | 4/2007 | Iino et al. | |
| 2001/0025481 A1 | 10/2001 | Magoshi et al. | |
| 2005/0015421 A1 | 1/2005 | Fuller | |

(Continued)

FOREIGN PATENT DOCUMENTS

JP  2006-180673  *  7/2006

(Continued)

OTHER PUBLICATIONS

Fernando D'Amato et al., "Model Predictive Control for Combined-Cycle Startups," ISA POWID/EPRI Controls and Instrumentation Conference and 49th Annual ISA POWID Symposium, Doubletree Hotel, San Jose, CA, Jun. 4-9, 2006, 11 pages.

(Continued)

*Primary Examiner* — Albert Decady
*Assistant Examiner* — Steven Garland
(74) *Attorney, Agent, or Firm* — Nixon & Vanderhye P.C.

(57) ABSTRACT

A method for forecasting a start period for a combined cycle power generation system including a gas turbine engine, a steam turbine and a computer control system, the method including: inputting a desired time at which the power generation system is to reach a dispatchable load; inputting a current value of a predetermined operational condition of the power generation system; the computer control system retrieving historical data relating the predetermined operational condition to prior start periods of the power generation system or a similar power generation system; the computer control system executing an algorithm which generates a forecasted start time based on the desired time, current value and the retrieve data, wherein the power generation system is predicted to reach the dispatchable load at the desired time when started at the forecasted start time, and the computer system outputting the forecasted start time to the output device.

20 Claims, 9 Drawing Sheets

U.S. PATENT DOCUMENTS

| | | |
|---|---|---|
| 2006/0178762 A1 | 8/2006 | Wroblewski et al. |
| 2006/0233637 A1 | 10/2006 | Yakushi et al. |
| 2006/0282177 A1 | 12/2006 | Fuller et al. |
| 2007/0005392 A1 | 1/2007 | Claremont et al. |
| 2007/0055392 A1 | 3/2007 | D'Amato et al. |
| 2007/0067114 A1 | 3/2007 | D'Amato et al. |
| 2009/0217665 A1 | 9/2009 | Holzhauer et al. |
| 2009/0292436 A1 | 11/2009 | D'Amato et al. |

FOREIGN PATENT DOCUMENTS

| | | | |
|---|---|---|---|
| JP | 2007-138856 | * | 6/2007 |

OTHER PUBLICATIONS

The European Commission, Community Research, Information Society Technologies, "Performance Assessment and Benchmarking in Application: Turbine Control System," 2001-2004, 32 pages.

C. Albanesi et al., "Optimization of the Start-up Procedure of a Combined Cycle Power Plant," Proceedings of the 45th IEEE Conference on Decision & Control, San Diego, CA, Dec. 13-15, 2006, pp. 1840-1845.

J. Bausa et al., "Dynamic Optimization of Startup and Load-Increasing Processes in Power Plants—Part I: Method," Journal of Engineering for Gas Turbines and Power, Transactions of the ASME, vol. 123, Jan. 2001, pp. 246-250.

J. Bausa et al., "Dynamic Optimization of Startup and Load-Increasing Processes in Power Plants—Part II: Application," Journal of Engineering for Gas Turbines and Power, Transactions of the ASME, vol. 123, Jan. 2001, pp. 251-254.

F. Casella et al., "Fast Start-up of a Combined-Cycle Power Plant: A Simulation Study with Modelica," Modelica 2006, The Modelica Association, Sep. 4-5, 2006, pp. 3-10.

J. Delson, "Thermal Stress Computation for Steam-Electric Generator Dispatch," IEEE Transactions on Power Systems, vol. 9, No. 1, Feb. 1994, pp. 120-127.

E. Gallestey et al., "Model Predictive Control and the Optimization of Power Plant Load While Considering Lifetime Consumption," IEEE Transactions on Power Systems, vol. 17, No. 1, Feb. 2002, pp. 186-191.

T. Iijima et al., "Hitachi's Latest Supervisory and Control System for Advanced Combined Cycle Power Plants," Hitachi Review, vol. 51, No. 5, 2002, pp. 153-157.

Y. Ohsawa et al., "Startup Optimization of a Combined Cycle Power Plant Based on Cooperative Fuzzy Reasoning and a Neural Network," IEEE Transactions on Energy Conversion, vol. 12, No. 1, Mar. 1997, pp. 51-59.

"Optimizing Generation Control for Combined-Cycle Plants—GE's closed loop generation control helps balance power/steam demand," Diesel & Gas Turbine Worldwide, Power-Gen International—Orlando, FL, Dec. 2004, http://www.gepower.com/prod_serv/serv/op_maint_serv/en/downloads/closed_loop_optimal.pdf, 4 pages.

"Solutions for Combined Cycle Power Plants," ABB Ltd., Business Unit Power Generation, 2006, pp. 1-8.

ST MPC FaStart Customer Manual, Customer Documentation and Training, Rev. 0, GE Energy, May 23, 2008, pp. 1-27.

Co-pending GE U.S. Appl. No. 12/040,296 (D. F. Holzhauer et al.), "Systems and Methods for Channeling Steam into Turbines," filed Feb. 29, 2008.

Co-pending GE U.S. Appl. No. 12/124,316 (F. J.D'Amato et al.), "Control of Combined Cycle Power Generation System," filed May 21, 2008.

\* cited by examiner

Fig. 4

| RH Rotor Temperature at Lead GT Roll (F) | Include in Permanent Starts Database | Start Date (MM/DD/YY) | Metal Temperature at GT Roll (F) | Start Time (min) | | Fuel Consumed (MMBTU) | | | Peak Rotor Stress (%) |
|---|---|---|---|---|---|---|---|---|---|
| | | | | Lead GT Roll to IPC (Stage 1) | IPC to Despatchable Load (Stage 2) | Lead GT Roll to IPC | IPC to Despatchable Load | Total | |
| 0-100 | | | | | | | | | |
| 100-200 | | | | | | | | | |
| 200-300 | Review | 01/07/09 | 284 | 72 | 45 | 763 | 1069 | 1832 | 89.23 |
| | Review | 01/06/09 | 263 | 84 | 95 | 1376 | 2154 | 3530 | 91.2 |
| | | 01/06/09 | 263 | 67 | 33 | 1021 | 757 | 1778 | 90.5 |
| | | 01/05/09 | 263 | 81 | 114 | 1318 | 4162 | 5480 | 87.38 |
| | Review | 01/07/09 | 395 | 78 | 117 | 1247 | 2756 | 4003 | 77.52 |
| 300-400 | | | | | | | | | |
| 400-500 | Review | 01/05/09 | 495 | 62 | 86 | 946 | 1862 | 2808 | 76.86 |
| 500-600 | | | | | | | | | |
| 600-700 | Review | 01/03/09 | 636 | 61 | 26 | 912 | 533 | 1445 | 84.12 |
| | Review | 01/03/09 | 636 | 54 | 43 | 806 | 1000 | 1806 | 82.25 |
| | | 01/02/09 | 632 | 69 | 51 | 671 | 1103 | 1774 | 79.62 |
| | | 01/02/09 | 630 | 80 | 97 | 671 | 2038 | 2709 | 73.83 |
| 700-1000 | Review | 01/05/09 | 786 | 75 | 23 | 1122 | 482 | 1604 | 60.35 |

Steam Turbine

Time Left (MM:SS)

Start Calc
 1X1
 2X1

Requires Review

Perf. Stat

Open Database

SYSTEM AND METHOD FOR SCHEDULING STARTUP OF A COMBINED CYCLE POWER GENERATION SYSTEM

BACKGROUND

The invention relates generally to combined-cycle (CC) power generation systems and, particularly, to scheduling the startup of a CC power generation system (also referred to herein as a "plant").

Plants are typically operated by or for power utilities that generate power which is ultimately dispatched via central wholesale market or regulated power system operator. A power utility may generate power from one or more CC power generation systems and other power generation systems.

The power demand on utilities tend to vary hour-by-hour, day-by-day, season-by-season and year-to-year. The power demands from their customers are forecasted by, for example, grid operators based on historical data regarding power demand and other information such as expected weather, requests for future power by customers and events scheduled to occur that impact the demand of power. The grid operators advise the power generation operators, e.g., utilities of the forecasted power demands. Because the power demand varies, the schedules prepared by power utilities for each plant are often finalized a short time before, e.g., the day before, the power is to be generated. Once the schedule is finalized, the operators of power generation systems determine when to start the CC power generation system (plant) to provide power at the dispatchable load level when the schedule indicates that the demand for the power will occur.

Determining when to start a plant poses a complex and difficult scheduling problem. The startup sequence takes a plant from an off condition to the condition at which the plant produces power at a dispatchable load level. Startup sequences are typically complicated schedules involving various gas turbines, steam turbines, boilers and other systems to generate steam, and electrical generators driven by the gas and steam turbines. When a plant is stopped, the gas turbine(s) are not being provided with fuel and the steam turbine(s) are not being provided with steam. When the plant is stopped, the gas turbine(s) and steam turbine(s) cool from their last operational condition. When the plant is restarted, the duration of, or time to complete, the startup sequence is dependent to a large extent by the temperature of the steam turbine(s) when the startup sequence is initiated.

It would be helpful to an operator of a plant to have a tool to accurately calculate the duration of a startup sequence. The operator typically knows when his plant is committed to produce power at a dispatchable load level. Knowing an accurate startup duration, would enable the operator to start the plant at the latest possible time and using the least amount of fuel so that the dispatchable load is reached just before the plant is committed to produce power.

To determine when to initiate a startup sequence requires the system operator to estimate the length of time required for the sequence. Calculating an accurate, condition-based startup schedule for a CC power generation system can be a laborious and complicated task conventionally performed manually by a system operator, due to the difficulty in accurately forecasting the duration of a startup sequence. Rather than calculating an accurate, condition-based startup schedule, plant operators typically forecast the startup schedule using previously prepared templates of startup periods for a few startup conditions. The prepared startup templates conservatively predict long startup periods to ensure a predicted startup period is never shorter than any of the variations of startup sequences to which the estimated period is applied. Because they are conservative, the prepared templates of startup periods may be applied generically to a broad range of initial conditions, such as the temperature of the steam rotor at the start of a startup sequence. The prepared templates may state the startup period significantly longer than most actual startup periods.

While reusing existing schedule templates expedites the preparation of a new startup schedules for a new operating day or time period, schedule templates often do not yield optimal startup sequences and startup duration for any given day or time period. Moreover, previously prepared schedules may incorporate long margins of time to ensure that the various power generation components are available to suit all of the potential situations to which the schedule may be applied. These long margins result in power generation components becoming available for use, e.g., dispatchable load, up to hours before the components may be needed and unnecessarily burning fuel inefficiently at low load levels. Arriving at a dispatchable load earlier than needed results in monetary losses due to power components being operated while the components wait to be applied to generate needed power and resulting in generated power being sold at sub-optimal price levels.

A difficulty with the prepared estimates of the startup duration is that the plant may reach the dispatchable load level a half hour or more before the plant is scheduled to produce dispatchable power. While the plant generates power before it is scheduled to provide power, the plant consumes fuel, generates excess heat and emissions, may operate at a relatively low efficiency, and the operator may be forced to sell the power at below market prices. A plant operating at dispatchable load without a sufficient demand is undesirable. Increased cyclic duty requirements, higher fuel costs, competitive deregulated energy markets, and stringent environmental regulations create a demand for faster and more predictable startup sequences from CC power generation system operations.

There is a long felt need for methods and systems to easily, quickly and accurately generate schedules and forecasts to startup CC power generation systems. The need exists because the conventional manual approach to selecting one of a few prepared startup schedules results in inefficiencies, such as those due to power generating components, e.g., gas turbines and steam turbines, that reach dispatchable load levels hours before these components are actually needed. Further, the requirements that power plants bid to generate power increases the need for accurate scheduling and forecasting tools to generate startup schedules quickly and that are optimized to reduce the cost of generating power.

Reducing the time required to start a CC power generation system is not the only consideration when starting the system. Power generation system owners manage different startup objectives depending on local environmental regulations, energy dispatch requirements, and current fuel and energy prices. The power generation system operator may need to minimize emissions, fuel costs, or net heat rate. These considerations may affect the timing of the startup operation. Each CC power generation system may have site specific factors that affect the startup schedule. There is a long felt need for startup schedules that accurately predict the startup duration for a variety of startup operating conditions of a CC power generation system.

BRIEF DESCRIPTION

A method for forecasting a start period for a combined cycle power generation system including a gas turbine engine, a steam turbine and a computer control system including a user input and an output device, the method comprising: inputting a desired time at which the combined cycle power generation system is to reach a dispatchable load; acquiring a current value of a predetermined operational condition of the combined cycle power generation system; the computer control system executing an algorithm which generates a forecasted start time based on the desired time and current value, wherein the combined cycle power generation system is predicted to reach the dispatchable load at the desired time when started at the forecasted start time, and the computer system outputting the forecasted start time to the output device.

A method for forecasting a start period for a combined cycle power generation system including a gas turbine engine, a steam turbine and a computer control system, the method including: inputting a desired time at which the power generation system is to reach a dispatchable load; inputting a current value of a predetermined operational condition of the power generation system; the computer control system retrieving data from a database relating the predetermined operational condition to prior start periods of the power generation system or a similar power generation system; the computer control system executing an algorithm which generates a forecasted start time based on the desired time, current value and the retrieved data, wherein the power generation system is predicted to reach the dispatchable load at the desired time when started at the forecasted start time, and the computer system outputting the forecasted start time to the output device.

A method for forecasting a start period for a combined cycle power generation system including a gas turbine engine, a steam turbine and a control system including having a user input and a display, the method comprising: determining a current turbine temperature of the steam turbine temperature at a current time; determining a target time period to dispatchable load as a period from the current time to a target time at which the power generation system is to be at a predefined power output level; selecting a forecasted start time period as a period from the current time to a start time for a startup sequences of the power generation system; based on the forecasted start time period and the current turbine temperature, determining an estimated turbine starting temperature at the forecasted start time; using the estimated turbine starting temperature, determining an estimated time period for the startup sequence; summing the forecasted start time period and the estimate time period for the startup sequence to calculate a total time period; comparing the total time period to a target time period from the first time to the target time; using the forecasted start time period to determine when to start the startup sequence, if the comparison determines the total time period to be within a predetermined period of the target time period, and decrementing the forecasted start time, if the comparison indicates that the total time period is outside of the predetermined period of the target time period, and thereafter repeating the steps of the method.

A method for forecasting a start time for a combined cycle power generation system including a gas turbine engine (GT), at least one steam turbine (ST) and a control system including a computer having a graphical user interface (GUI) a user input and a display, the method comprising: entering into the control system a temperature of at least one of the steam turbines, wherein the temperature corresponds to a first time; determining by the control system a target time period as a period from the first time to a target time at which the power generation system is scheduled to be at a dispatchable load; selecting by the control system a forecasted start time period as a period from the first time to a start of a startup sequence for the power generation system; based on the forecasted start time period and the first temperature, determining by the controller an estimated turbine temperature to occur at the forecasted start time; based on the estimated turbine temperature, determining by the controller an estimated time period for the startup sequence; summing by the controller the forecasted start time period and the estimated time period for the startup sequence and generating an estimated total time from the first time to the end of the startup sequence; comparing by the controller the estimate total time and the target time period; the controller outputting the forecasted start time, if the controller in making the comparison determines the estimated total time period is within a predetermined period of the target time period, and decrementing by the controller the forecasted start time, if the controller determines that the estimated total time period is outside of the predetermined period of the target time period, and repeating the method.

A computer control system for generating a forecasted start period for a combined cycle power generation system having a gas turbine engine and a steam turbine, the computer control system comprising: a user input to receive a desired time at which the combined cycle power generation system is to reach a dispatchable load, and a current value of a predetermined operational condition of the combined cycle power generation system; an output device to output a forecasted start time, wherein the combined cycle power generation system is predicted to reach the dispatchable load at the desired time when started at the forecasted start time, a processor; electronic memory having stored thereon: data indicating the desired time, the current value; a database having historical information relating the predetermined operational condition to start periods of the combined cycle power generation system or a similar combined cycle power generation system, and an algorithm to generate the forecasted start time based on the desired time, current value and data retrieved from the database.

A control system for a combined cycle power generation system comprising a gas turbine and a steam turbine, the control system including a processor and an electronic memory storing a database of prior startup processes and a computer program for scheduling a start time for a future startup process, the program causing the processor to perform process steps comprising: entering as an input to the control system a current temperature of the steam turbine; determining by the control system a time period to dispatchable load period as a period from a current time to a target time at which the power generation system is scheduled to be at a dispatchable load; selecting a forecasted start time period as a period from a current time to a start of a startup process for the power generation system; based on the forecasted start time period and the current temperature of the at least one of the steam turbines, determining an estimated rotor temperature at the forecasted start time; based on the estimated rotor temperature, determining an estimated time period for a startup process which is a period initiated at the forecasted start time and ending when the power generation system reaches a predefined dispatchable load; summing the forecasted start time period and the estimated time period for the startup process to generate a total time to dispatchable load; comparing the total time to the dispatchable load to a time period from the current time to the target time; based on the forecasted start time period, determining when to start the startup process, if the controller in making the comparison determines the total time to dispatchable load to be within a predetermined period of the current time to the target time, and decrementing the forecasted start time by a predetermined period, if the controller determines in the comparison that the total time to dispatchable load is outside of the predetermined period of the current time to the target time, and repeating the method.

SUMMARY OF THE DRAWINGS

These and other features, aspects, and advantages of the present invention will become better understood when the following detailed description is read with reference to the accompanying drawings in which like characters represent like parts throughout the drawings, wherein:

FIG. 4 is a screen image of the computer display screen showing an exemplary presentation of data stored in a database of a controller of the combined cycle power generation system, wherein the database includes historical information regarding prior startup sequences of the system and, optionally, of similar systems.

DETAILED DESCRIPTION

Figure 1:
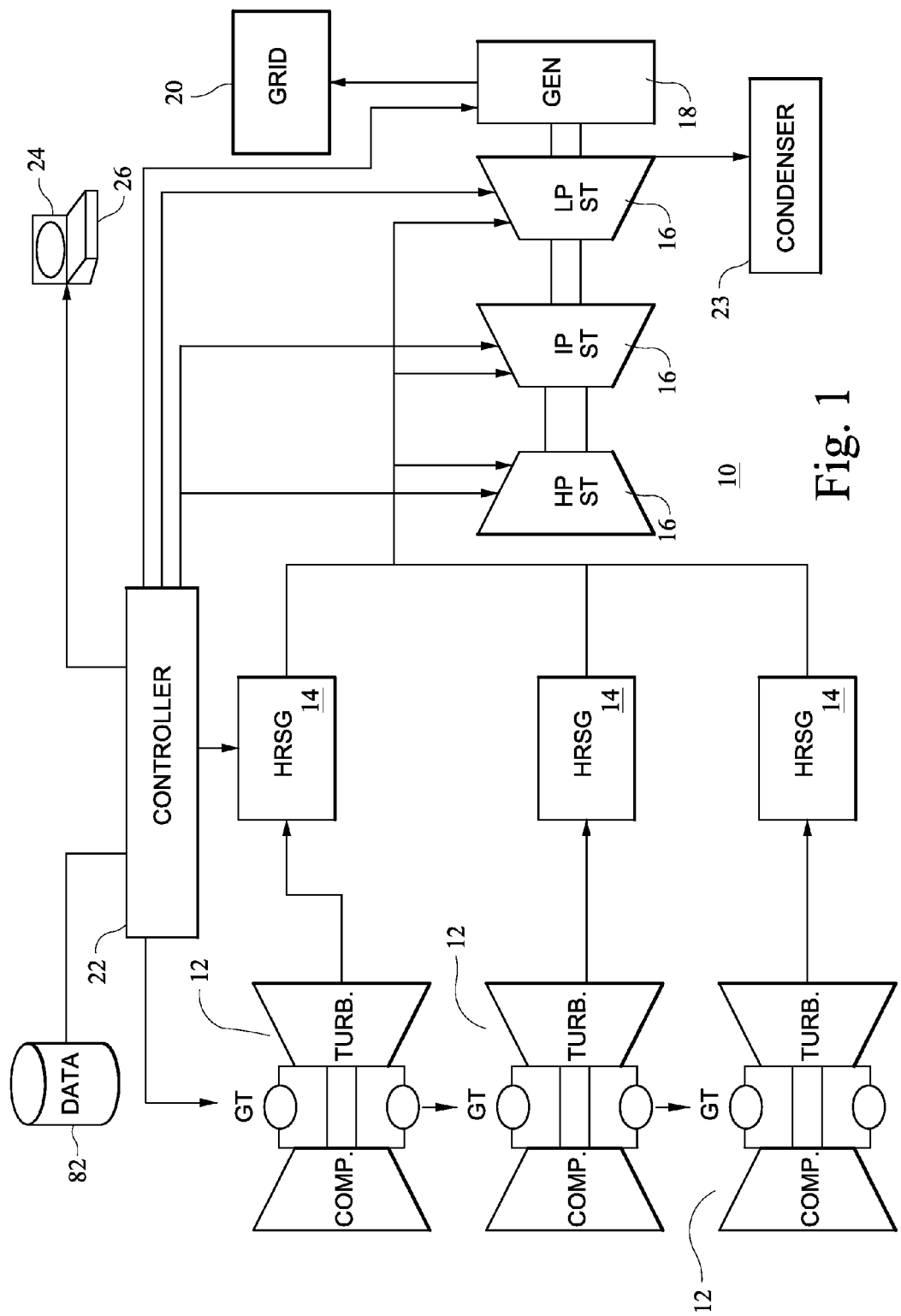
FIG. 1 is a schematic diagram of an exemplary combined-cycle power system.

A human machine interface (HMI) has been developed to assist an operator of a combined cycle power generation system (also referred to as a plant) to forecasting and schedule the initiation of a startup process of the plant. The HMI may be embodied as a series of interactive computer system(s) generating screen images which enable an operator to interact with a computer software suite, software based model of the steam turbine components of the plant, and a database of historical information on startups of the plant and similar plants. The HIM may acquire information regarding a schedule for reaching dispatchable load and the current operating condition of the combined cycle power generation system from operator inputs and from sensor data, auxiliary algorithms in control systems for the power generation system and other inputs. The HIM generated screen images present to the operator possible selections and information regarding the combined cycle power generation system, such as: (i) the plant configuration, e.g., one gas turbine and one steam turbine (1X1), two gas turbines and one steam turbine (2X2), and three gas turbines and one steam turbine (3X1); (ii) current conditions, e.g., rotor temperature of a steam turbine; (iii) time remaining until a dispatchable load is needed from the plant; (iv) historical startup performance for recent startup operations of the plant; (v) proposed schedules and forecasts for initiating the startup sequence for the plant, and (vi) historical statistical data, such as minimums, maximums, means and standard deviations of operating parameters of the cc power system, including steam rotor temperature.

The HMI provides a tool for estimating a time period needed to perform a startup sequence based on an estimated start condition of the plant. The HMI tool calculates a period for the startup sequence based on a known starting condition, such as the initial rotor temperature for a steam turbine in the system. To determine the known starting condition, the HMI tool performs a calculation to estimate the amount of time for a startup sequence of the plant enables the HMI tool to forecast when to initiate the startup sequence to cause the plant to reach a dispatchable power level when the demand for the power from the plant is scheduled to occur. The outputs of the HMI screen are presented in a way that makes it easy for the plant operator to communicate the inputs such as start time and fuel burn needed by a dispatcher, grid operator or power trader. A technical effect of the, the HMI computer system is to generate a forecasted start time for a combined cycle power generation system which is the "latest" time at which the system can be started and reach the dispatchable load at the scheduled time to provide the requested power to, for example, a power grid. For example, the forecasted start time may cause the power generation system to reach the dispatchable load no more than three to five minutes before the scheduled time to provide the requested power.

The heating of the turbine during the startup sequence is a dominant factor in determining the time required for a startup sequence of the plant. Steam turbines require a relatively long start period, as compared to the start periods needed to start a gas turbine and other components of CC power generation system. By estimating the time to start a steam turbine, the period of a startup sequence can be estimated. The time needed to start a steam turbine can be determined based on correlations between current conditions and historical data or modeled, such as by using a look-up table correlating rotor temperatures to startup time period. A model of the steam turbine may also be a set of mathematical algorithms that accurately predict operating conditions of the turbine based on predefined input conditions. Using the model of the steam turbine, the period of a startup sequence can be predicted based on the initial temperature of the steam turbine at the initiation of the startup sequence. Moreover, a model of the steam rotor may be used to predict future turbine temperature FIG. 1 is a schematic diagram of a combined cycle (CC) power generation system (plant) 10 comprising one or more gas turbine engines (GTs) 12, a heat recovery steam generator (HRSG) 14, one or more steam turbines (ST) 16, a steam condenser 23 and one or more electrical generators 18 that output electrical power to a power demand, such as to an electrical utility grid 20 and customers connected to the grid.

A control system 22 monitors and controls the CC power generator system by sensing operating conditions of the components of the system, such as the rotor temperature of the steam turbine(s), steam inlet and outlet pressures to the HRSG and to the steam turbines, power output by each of the gas and steam turbines, fuel flow and consumption by the gas turbines and power output of the generator. The control system captures, stores and provides data regarding the current and historical operating conditions of the CC power generation system.

The control system 22 also provides commands to the CC power generation system, such as to adjust fuel flow to each of the gas turbines, initiating a start sequence in the gas turbines and steam turbines, and connecting the electrical power outputs of the generators to the utility grid after the system reaches a dispatchable load level. For example, the control system may generate commands that start the CC power generation system according to a startup sequence inputted or approved by a system operator interacting with the control system.

The control system 22 may be a computer control system having a central processing unit (CPU), computer memory storing software programs such as a software control suite, a user display screen 24, user input devices 26, such as a keyboard, and communication modules that receive sensor signals from sensors monitoring the CC power generation system and data generated regarding the system.

Figure 2:
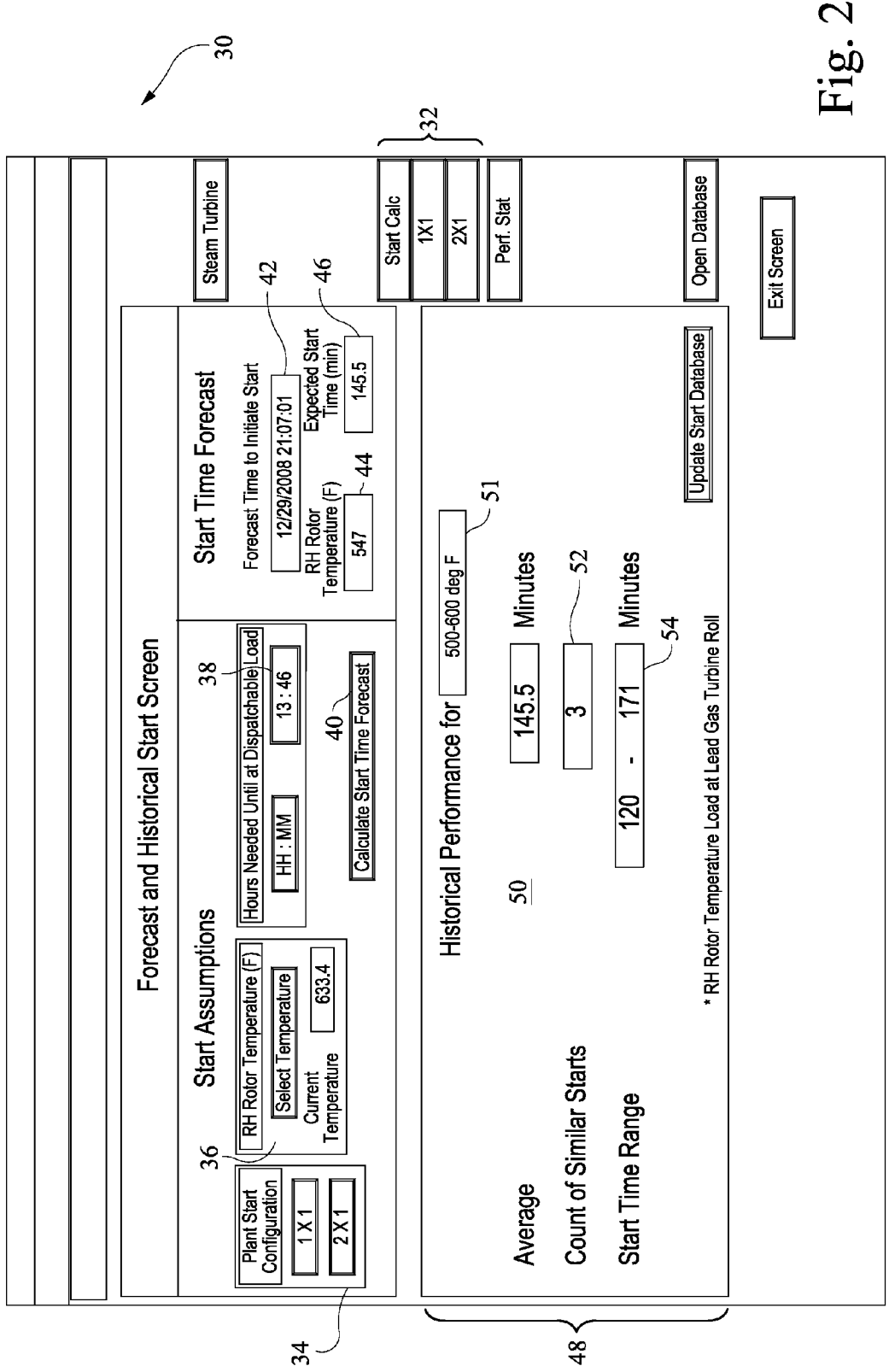
FIG. 2 is a screen image of a computer display screen generated by an exemplary human-machine interface (HMI) computer system for forecasting the start of a startup sequence for a combined cycle power generation system.

FIG. 2 is a screen image 30 of a computer display screen 24 showing an exemplary human-machine interface (HMI) for calculating a proposed start time for a combine cycle power generation system. The screen image 30 provides information and selectable options for calculating a recommended start time for a startup sequence of the plant. The screen image includes selectable navigation buttons 32 that an operator, using the input devices 26, can select to switch screens between the start period calculation screen 30 and a performance statistics screen, shown in FIG. 3. In addition, the navigation buttons 32 are used to set the plant configuration (see button bars labeled 1X1 and 2X1) for inputting to the computer system the plant configuration of the plant for which a start time is to be forecasted.

The screen image 30 presents the initial plant conditions inputted to the computer system and used to forecast a start time for the startup sequence of the plant. The initial plant conditions include the plant configuration 34 (which may be manually inputted), the current temperature 36 of a steam turbine (which may be automatically or manually inputted based on temperature sensor data detecting the rotor temperature on the steam turbine), and a target time 38 which is when the plant is scheduled to reach a dispatchable load level.

After the operator confirms that the input conditions 34, 36 and 38 are correct as displayed on the screen image, the operator activates the calculation screen button 40 to cause the computer system to apply the input conditions to forecasting algorithm and generate a forecasted start time 42 to initiate the startup sequence of the plant. The start time forecast 42 is displayed on the screen image 30. In addition, the screen image may display the expected rotor temperature 44 of the steam turbine, e.g., the reheat (RH) steam turbine, in the plant at the initiation of the startup sequence and display the amount of time remaining 46, e.g., 145.5 minutes, after the startup sequence is initiated.

The screen display 30 may also display historical information 48 of the same plant and similar plants executing startup sequences while operating in the same configuration as selected by the navigation buttons 32 and having an initial rotor temperature as shown in rotor temperature display 44. The historical information 48 may include comparative start data 50 of the average period for the startup sequence for the plant(s) under similar conditions, such as, a range 51 of steam rotor temperatures and plant configuration. The range 51 may be automatically selected as corresponding to the estimated rotor temperature 44 at the forecasted start 42 of the startup sequence. The historical information may also include a display of the number count 52 of startup sequences performed under similar conditions, and the range 54 of the length of time for the startup sequences performed under similar conditions.

Figure 3:
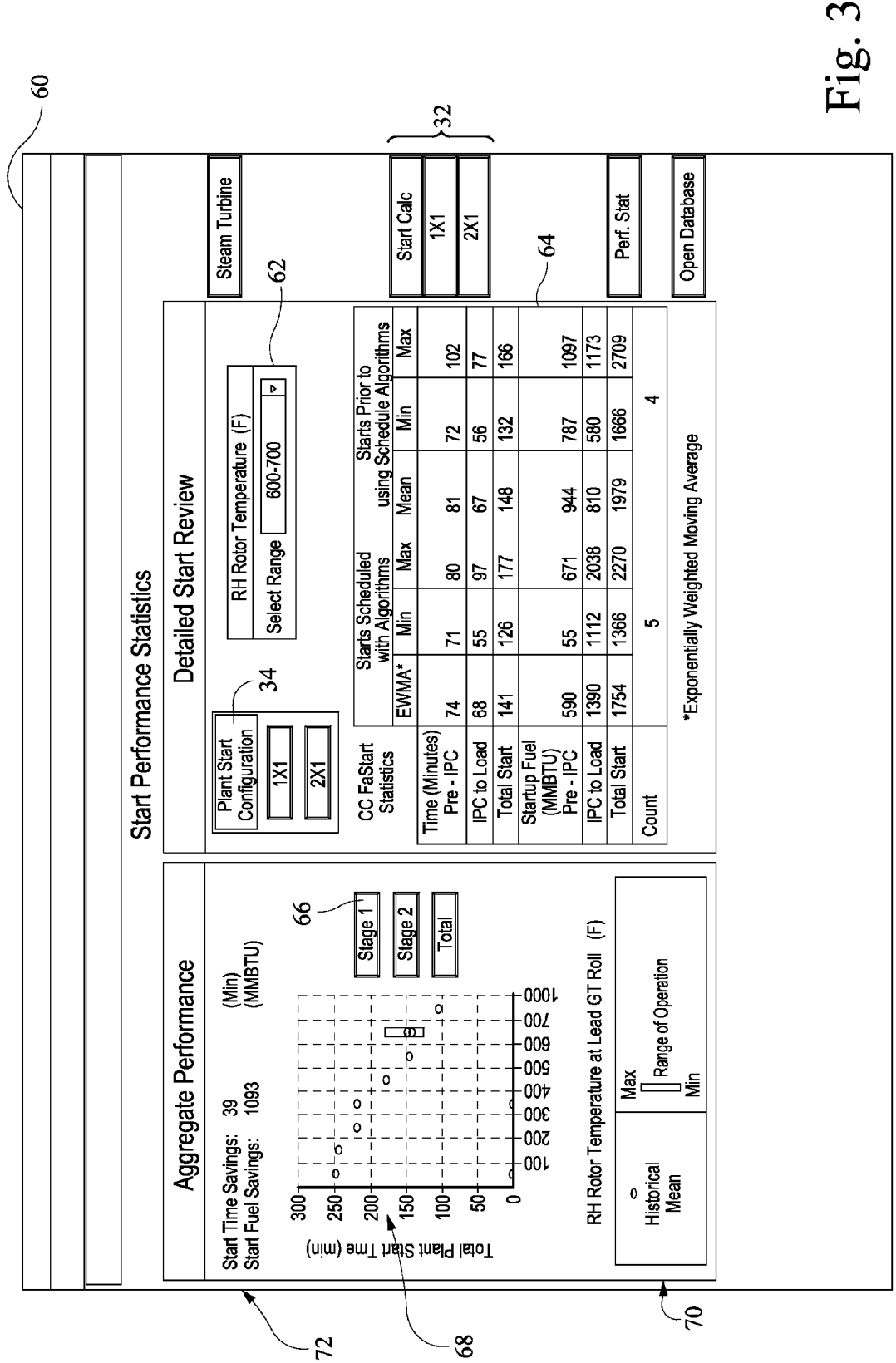
FIG. 3 is a screen image of the computer display screen showing an exemplary presentation of statistics of prior startup sequences of the combined cycle power generation system.

FIG. 3 is a screen image 60 showing statistics on historical startup processes of the plant. To view the statistics the operator first inputs the plant configuration, e.g., 1X1 or 2X1, using the buttons 34 and selects a temperature range pull-down menu 62 corresponding to the starting steam turbine rotor temperature, e.g., 600-700 degrees Fahrenheit. The selected temperature range may be used as the temperature range 51 in the screen image 30. Alternatively, the temperature range 51, 62 may be automatically selected by the computer as a range including the estimated temperature of the rotor of the steam turbine at the start of the startup sequence for the plant. This screen is tailored to plant engineers and managers that seek to troubleshoot, benchmark and optimize start times.

Upon selection of a temperature range 62 and the plant configuration 34, the computer system displays charts of statistics 64 of historical startup sequences performed by the plant where the startup began with a steam rotor temperature in the range 62. The charts 64 may be arranged to show startup data for various startup parameters. For example, the statistics may show the startup data in terms of time, e.g., minutes, and fuel consumed, e.g., such as a million British Thermal Units (MMBTU).

Figure 9:
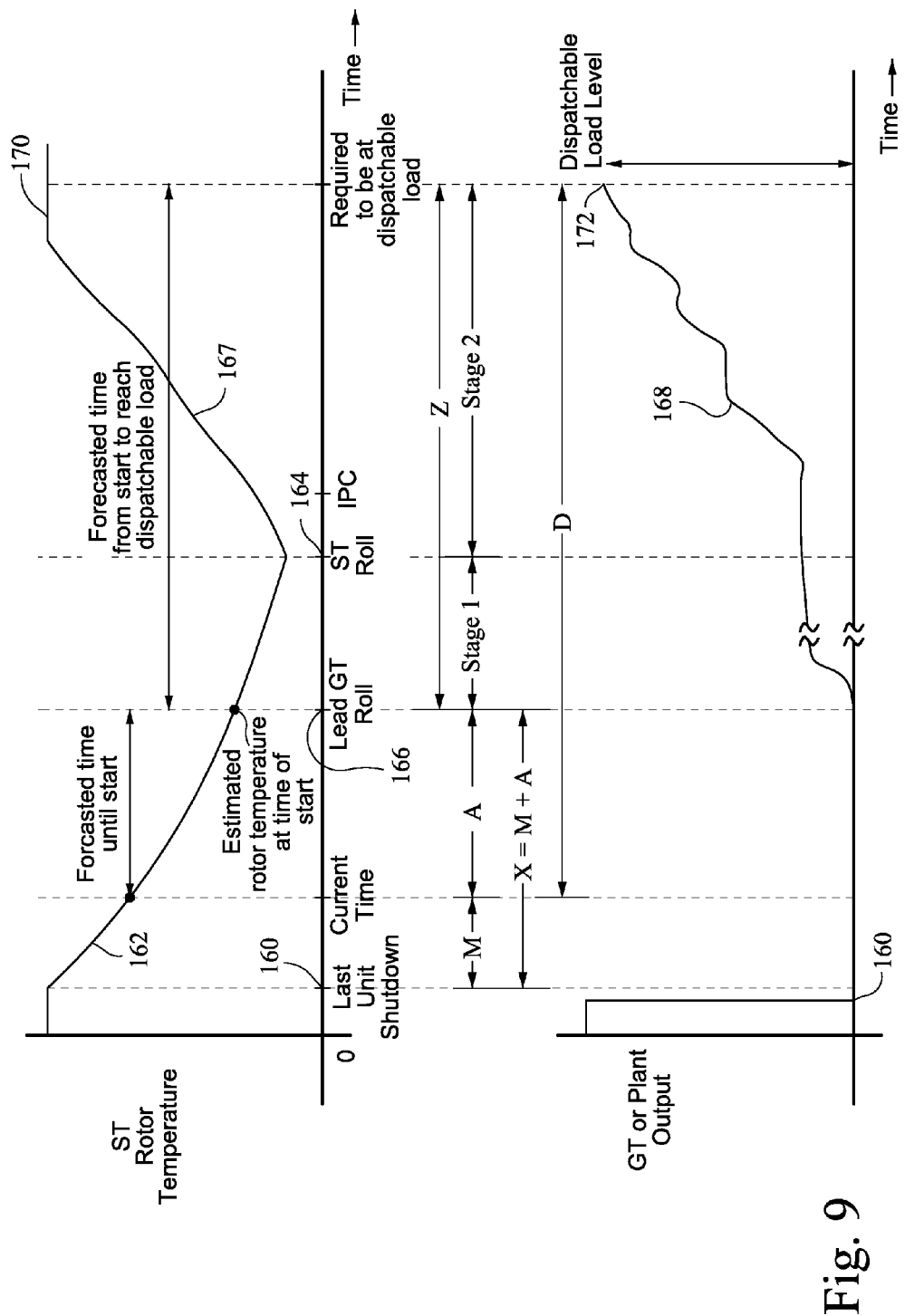
FIG. 9 presents timing charts showing steam turbine (ST) rotor temperature and power output during a startup period.

The startup data may also be divided in the charts 64 between "pre-IPC" and "IPC to Load". The period pre-IPC refers to the portion of the startup period that begins with the start of the startup period and ends when the steam turbine is placed on inlet pressure control (IPC). The period pre-IPC is often subject to manual settings and thus varies due to adjustments made by the operator of the plant. The period from IPC to load (which is dispatchable load) tends to be automated and not subject to manual settings of the operator. The statistics that are presented in the chart 64 may represent averages (EWMA) for several startup processes having the same plant configuration (1X1 or 2X1) and rotor temperature at start. In addition to averages, the presented statistics may include minimum and maximum times and fuel consumed for the historical starts. In addition, the presented statistics may include data for startup processes that where scheduled with an automated forecaster, such as disclosed herein ("Stage2", and with conventional manual startup scheduling techniques ("Stage1") as shown in FIG. 9. The startup processes may include two or more stages. The two stages disclosed here are for illustrative purposes in FIG. 9.

The screen display 60 may also include graph selection buttons 66 for selecting graphs 68 showing various arrangements of historical plant startup data such as the total period of a startup sequence correlated to the steam turbine rotor temperature at the start of the startup sequence. The data correlating rotor temperature at the start of the startup sequence may be graphed with respect to the period of the start time to pre-IPC and the period of IPC to dispatchable load. A legend 70 may provide a text explanation of the graphs 69 and other data presented on the screen image 60.

The start of the startup sequence for the plant may be defined as when the lead gas turbine (GT) is started. The screen image 60 may also display an estimate of time and fuel and time savings 72 due to using the automated forecaster, such as disclosed herein, as compared to conventional manual startup scheduling techniques.

FIG. 4 is a screen image 80 showing the database fields of a database 82 (See FIG. 1) of startup processes for the plant and possibly similar plants. The database may have data fields for various temperature ranges 84 for the rotor temperature of the steam turbine at the start of a startup sequence. The temperature ranges 84 may correspond to the temperature ranges shown in FIG. 2 at 51 and in FIG. 3 at 62. The database fields may also include additional fields 86 for data regarding the start date of each startup sequence represented in the database; the rotor temperature for one or more of the steam turbines in the plant, such as the reheat and high pressure steam turbines; the time periods, e.g., in minutes, from start to IPC, from IPC to dispatchable load and the total time for the startup process; the amounts of energy consumed (MMBTU) from start to IPC, from IPC to dispatchable load and the total energy consumed during the startup process, and the peak rotor stress during the startup process. In addition, screen display 80 may include data entry fields 88 to allow the operator to enter data from a particular startup process permanently into the database.

Figure 5:
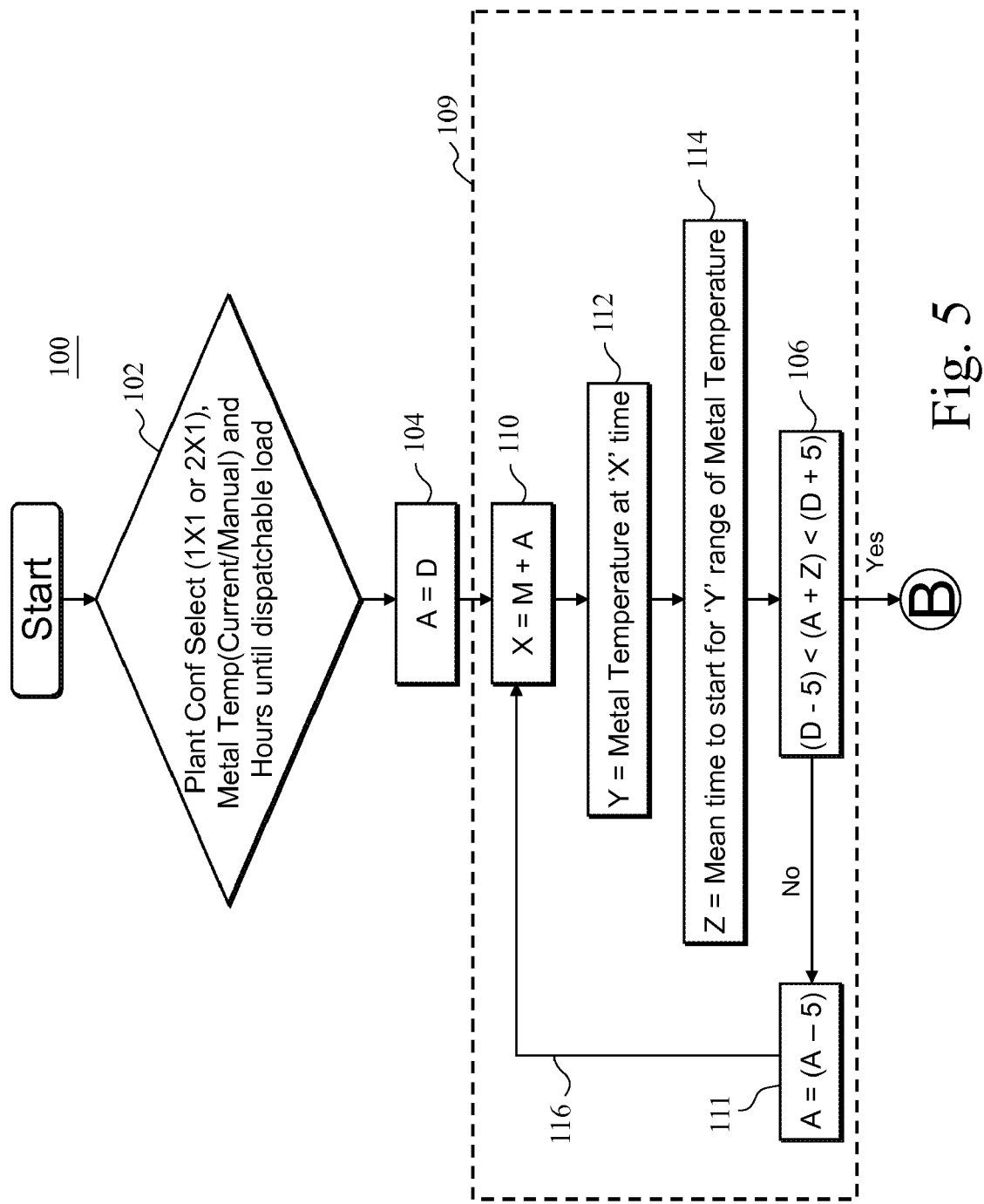
FIGS. 5 to 8 are exemplary flow charts of an algorithm executed by the controller for generating a forecasted start of a startup sequence for the combined cycle power generation system.
Figure 6:
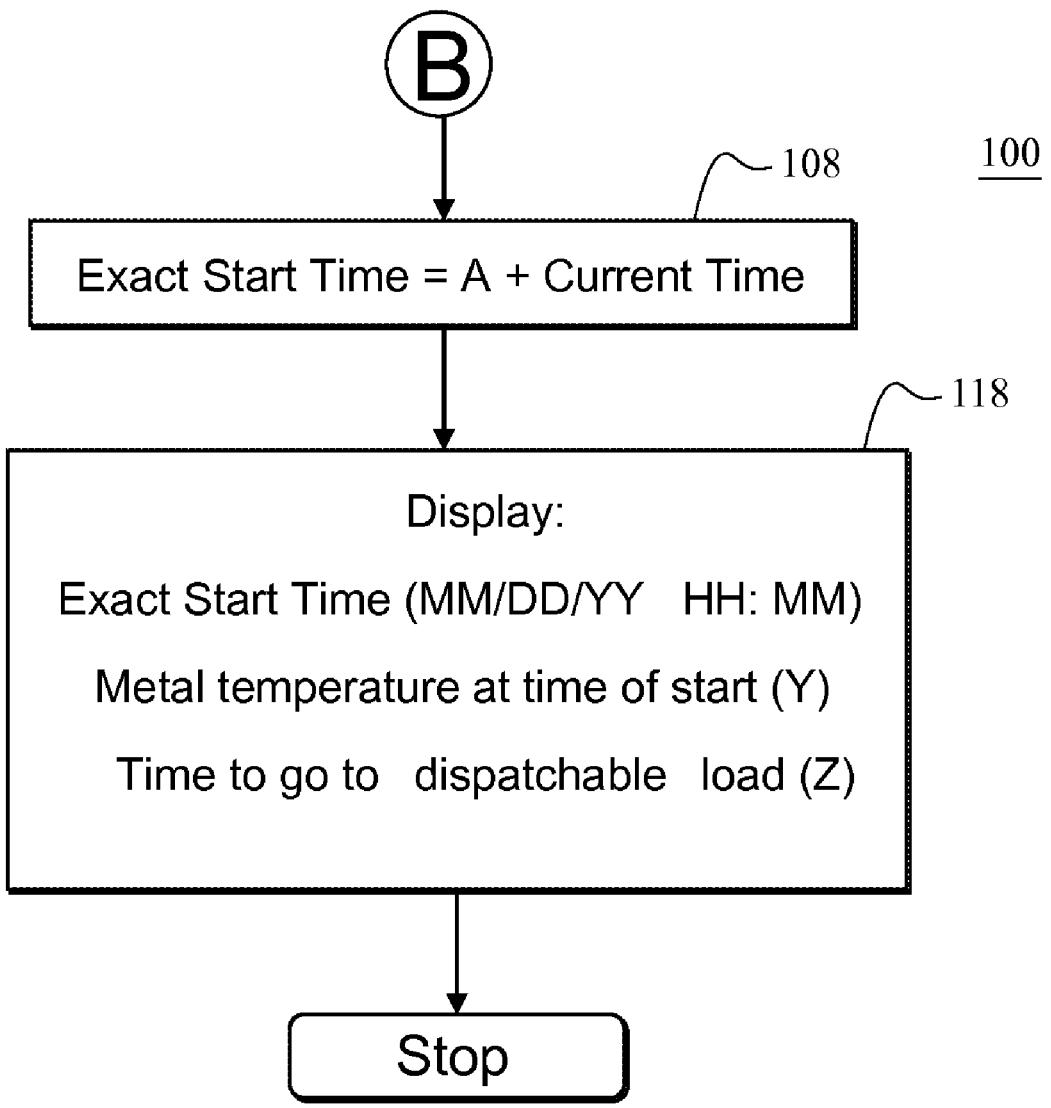

FIGS. 5 and 6 show an exemplary flow chart of an algorithm 100 to forecast a period needed to start a combine cycle (CC) power generation system. At the start of the algorithm, data 102 is collected regarding initial conditions of the CC power generation system (plant), for example: (i) the configuration of the CC power generation system, e.g. a 1X1 and 2X1 configuration of gas turbines in and steam turbines; (ii) the current metal temperature of the steam turbine, e.g., the metal temperature of a first row of turbine buckets in a reheat steam turbine, and (iii) the amount of time until the CC power generation system is to produce power at a dispatchable load level.

The rotor temperature of the steam turbine may be selected as an input condition because the steam turbine(s) has a slow rate of heating as compared to other components in the CC power generation system. The steam turbine(s) require the most time to heat to a temperature at which the CC power generation system produces dispatchable power for the intended load. These initial conditions entered in step 102 may be manually entered into a memory of the computer system executing the algorithm 100 and which will generate the forecast for the start period of the CC power generation system. Otherwise, the initial plant conditions may be automatically obtained by the computer system based on data captures from sensors monitoring the CC power generation system and for data sent to the computer, such as regarding a timing schedule of when a power load will require dispatchable load power from the CC power generation system.

The forecasted start time is the time from the current time to when steam turbine the CC power generation system is to be started, such that the system reaches the dispatchable load level when the load is scheduled to be delivered to the power grid. Initially, in step 104, the forecasted start period (A) is set to equal the remaining period (D) until the plant is scheduled to provide a dispatchable load to the grid. This initial setting for the start period (A) is not a realistic actual start time as the plant does to immediately reach dispatchable load.

The initial setting for the start period (A) is used to initiate a calculation 109 to determine a practical start time that will allow the plant to reach its dispatchable power load level when the plant is scheduled to deliver the power load level. The calculation 109 determines whether the forecasted start period (A) will result in the plant reaching its dispatchable load power level when the time period (D) expires. The remaining period (D) is the period remaining until the plant is scheduled to provide the dispatchable load power. If the forecasted period (A) does not result in the plant reaching its dispatchable load at the expiration of time period (D), the forecasted time is adjusted, e.g., decremented by five minutes, in step 111.

In the calculation 109, a comparison 106 is made between a forecasted time period (A+Z) until the plant will reach the dispatchable power level to the remaining period (D) until the plant is scheduled to reach that power level. If the forecasted time period (A+Z) is within a predetermined time period 106, e.g., within five (5) minutes, of the remaining period (D), the start period (A) is acceptable and the algorithm 100 calculates an exact start time as the start period (A) added to the current time.

The calculation 109, at step 110, determines a period (X) as the sum of the metal cooling time period (M) and the subsequent startup duration to estimate the duration from the current time to the plant reaching a dispatchable load. During the cooling time period (M), the steam turbine continues to cool and the metal temperature of the rotor in the steam turbine falls to the current rotor temperature. The time "M" is the number of hours taken by the steam turbine to cool to the current rotor temperature.

To estimate the period (Z) for the startup sequence, the algorithm uses the estimated rotor temperature (Y) 112 of the steam turbine when the startup sequence is initiated. To estimate the rotor temperature (Y) when the startup sequence is initiated, the algorithm 100 determines the rotor metal temperature drop due to cooling of the rotor from its current rotor temperature to the rotor temperature at the estimated start time for the startup sequence.

The cooling period (X) is used to determine a predicted metal temperature (Y) at the start time (A), in step 112. The determination of metal temperature (Y) may use a look-up table stored in computer memory that correlates a particular metal temperature, e.g., the first row of turbine blades in the reheat (RH) steam turbine. The look-up table or model of the steam turbine/rotor may be prepared based on historical data of the plant regarding rotor cooling times and temperatures in the RH steam turbine.

In step 114, a forecasted time period for startup sequence (Z) is determined based on the predicted metal temperature (Y) as the start time (A). The time period for startup (Z) is the period from the start time (A) to the CC power generation system reaching the dispatchable load power level. The forecasted startup time period (Z) may be determined from a look-up table stored in the computer of the CC power generation system that correlates the forecasted startup time period (Z) to the metal temperature (Y) at the start time (A), which is the initiation of the startup time period. The look-up table for determining the startup time period (Z) may be developed based on empirical data from earlier startup procedures with the same or similar CC power generation systems having the same configuration, e.g., 1X1 or 2X1.

When, in step 106, a start time (A) is determined that results in a startup time period (A) that is within a predetermined range of the time (D) when the CC power generation system is scheduled to deliver the dispatchable load, the calculation 109 is completed and an exact start time is determined in step 108. The exact start time is determined based on the current time and the time to start (A). The exact start time is displayed, in step 118, to the system operator, such as by being presented in the screen image shown in FIG. 2. In addition, the display may show the metal temperature (Y) at the time of start and the time until the CC power generation system reaches the dispatchable load level. The generation and display of the start time, predicted metal temperature and total time to dispatchable load are technical effects achieved with the algorithm 100.

If the forecasted start time (A) is not within a predetermined period, e.g., within 5 minutes of the time (D) at which the dispatchable load is scheduled, (step 106) the calculation 109 is repeated, in step 116. Before repeating the calculation, the start time (A) decremented, such as a predetermined amount of five (5) minutes, in step 111. By decrementing the calculation of the start time (A) and repeating the calculation 109, the start time (A) will be adjusted until the start time (A) results in a startup procedure that results in the CC power generation system reaching the dispatchable load level at the time scheduled for the dispatchable load to be delivered to the power grid or other customer facility.

Figure 7:
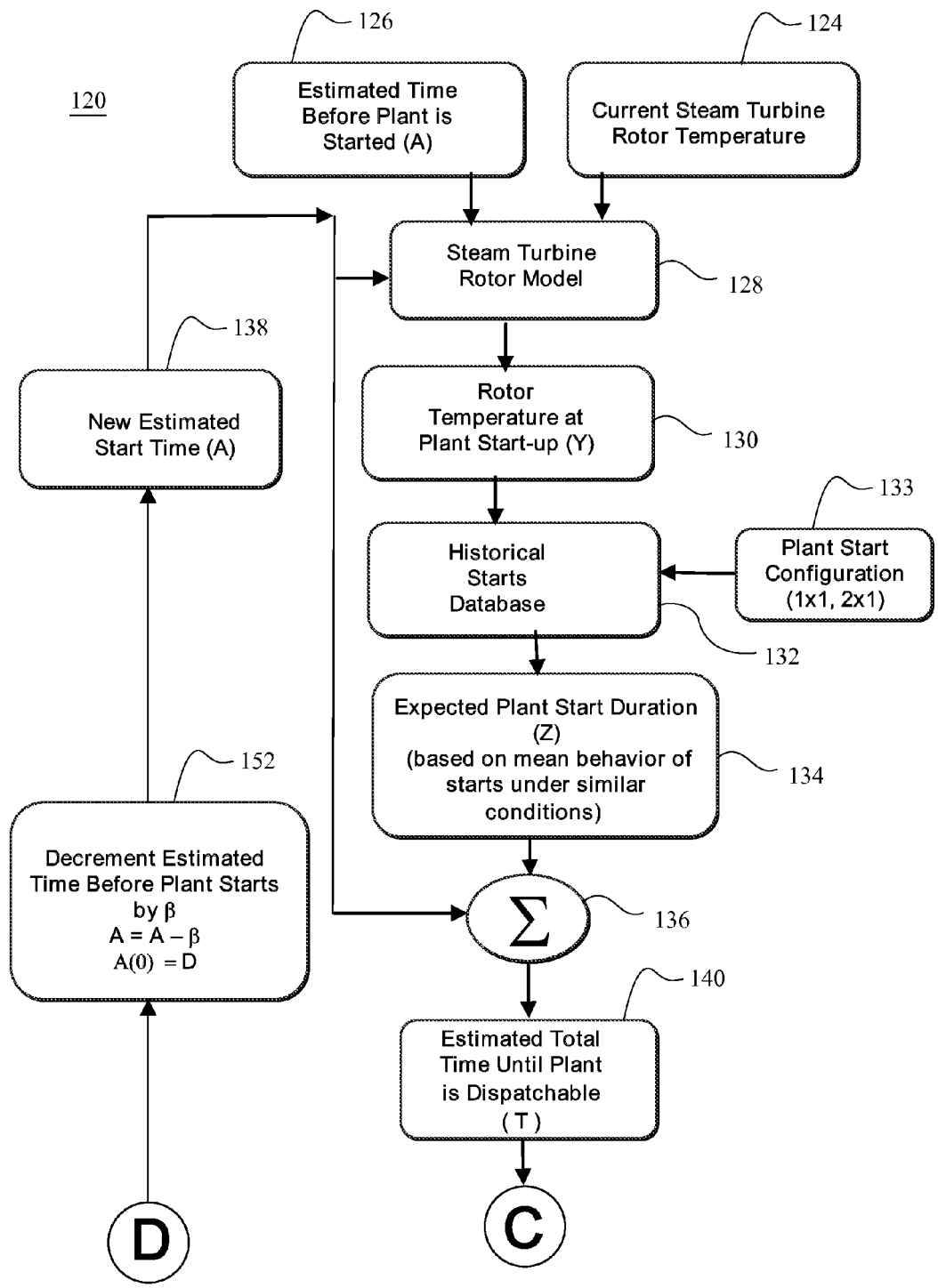
Figure 8:
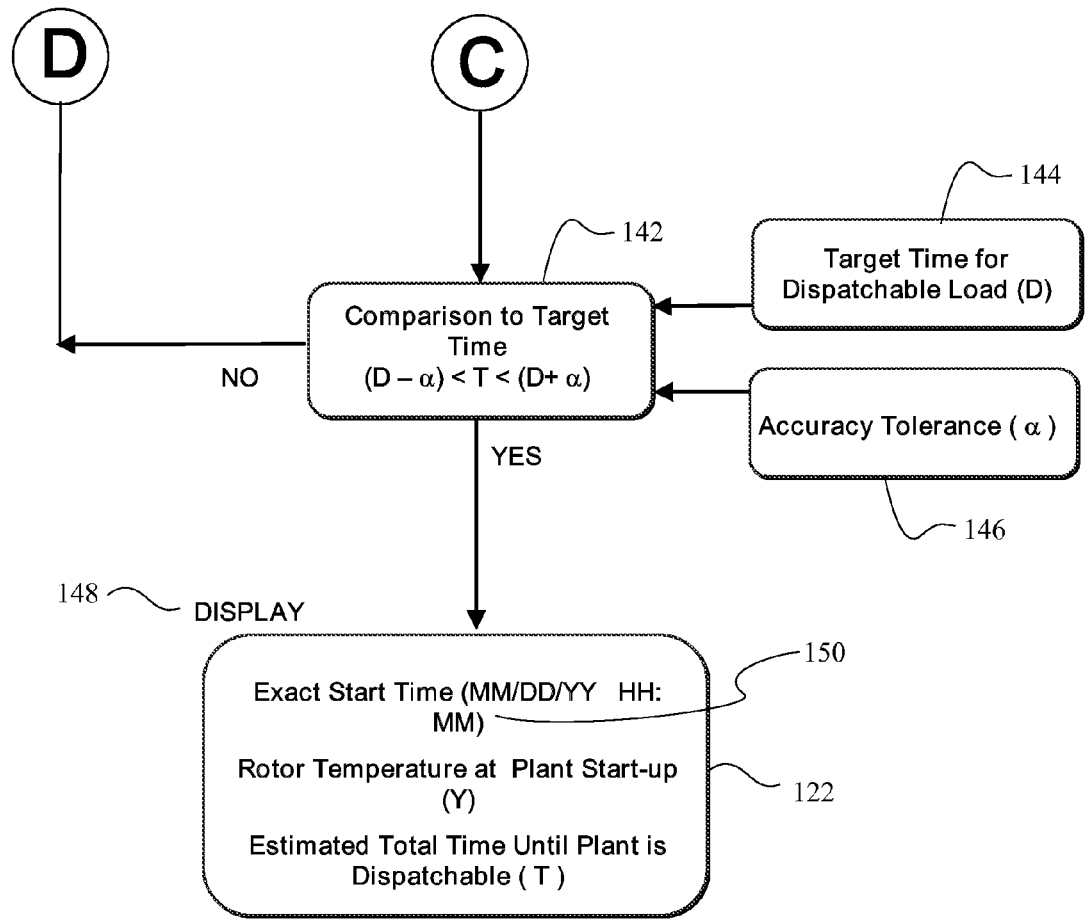

FIGS. 7 and 8 are an exemplary flow chart of an algorithm 120 to determine a forecasted start time (A) 122 for a CC power generation system (plant). The current steam rotor temperature 124 and initial estimated start time (A) 126 are provided as input data to the computer and applied to a steam turbine rotor model 128 electronically stored in memory of the computer for the plant. The steam turbine rotor model 128 simulates the metal cooling rates of the rotor of a steam turbine in the plant, such as the reheat (RH) steam turbine. The model 128 may be a look-up table that correlates the rotor metal temperature at various times, e.g., every five minutes, during a steam turbine cooling period. Based on the input data 124, 126, of the current rotor temperature and the estimated time to start the plant, the computer access the steam turbine rotor model to determine a predicted temperature (Y) 130 of the rotor at the start of the system.

The predicted rotor temperature (Y) 130 at the start of the startup sequence and the plant configuration (1X1 or 2X1) 133 are inputs used to access a database 132 of historical starts of the plant starts for the same plant or for similar plants. The database has information regarding the time period from the start of a plant startup operation to when the plant reaches dispatchable load. The database may include information on the most recent startup procedures. Data on older startup periods may be deleted from the database, if the computer memory storing the database lacks sufficient memory capacity. The computer by accessing the database 132 generates a predicted startup time period (Z) 134 for the startup sequence, where the period (z) is from start of the plant to when the plant reaches a dispatchable load. The startup period (Z) may be based on a mean startup sequence behavior based on earlier startup sequences of the plant performed when the plant has the same configuration and started at a similar steam turbine rotor temperature.

The predicted startup time period 134 is added, in step 136, to the current estimated start time to yield a summation of the forecasted start time and the startup period. The summation of the total time until the plant is forecasted to reach dispatchable load 140 is compared 142 to a target time (D) 144 at which the plant is scheduled to reach the dispatchable load level.

If the difference between the estimated total time (T) 140 and the target time (D) 144 is within a predefined period of tolerance (a) 146, the current estimated start time (A) 140 is output by the computer to an associated display device 148 which presents the forecasted start time 122 as the current estimated start time (A) 138 in terms of the month, date and year and time in hours and minutes (MM/DD/YY HH:MM) 150 at which the plant should be started and the startup period begun. In addition, the computer may output the predicted rotor temperature (Y) of the steam turbine at the start of the startup sequence and the estimated total time (T) from a current time to when the plant reaches the dispatchable power load level.

The period of tolerance (α) 146 may be an input that is manually set and defines a period of time, e.g., 5 minutes to 30 minutes, around the target time during which it is acceptable for the plant to reach dispatchable load level.

If, in step 142, the difference between the target time period (D) 144 and current estimated total time to dispatchable load (T) 140 is beyond the tolerance period 146, the current estimated time before the plant starts is decremented, e.g., by five minutes, to generate a new current estimated time (A) 138 until the plant starts. The period of tolerance (α) 146 may be the same period used to decrement the estimated start time (A) in step 152. Using the new current estimated time before the plant starts (A) 138, the algorithm 120 is repeated to generate a new estimated time until the plant reaches dispatchable load. The current estimated start time (A) will be sequentially decremented and the algorithm repeated, until the total estimated time (T) until the plant reaches dispatchable load is within the tolerance period of the target time (D) for the plant to be at dispatchable load.

FIG. 9 presents time charts showing an exemplary startup sequence for a combined cycle power generation system. As shown in the figure, the sequence begins when the power generation system is shut-down 160 at which point the power output of the entire system or at least just the gas turbine(s) (GT) falls to zero. After shut-down, the steam turbine (ST) rotor temperature gradually cools 162 because hot gases are not passing through the ST. The rotor continues to cool until hot gasses from the gas turbine is applied to steam turbine at which point 164 the steam turbine begins to rotate or "roll". Prior to the ST roll point, at least the lead gas turbine is started 166. After the ST roll point, the ST rotor temperature begins to increase 167 along with the power output 168 of the CC power generation system. As the ST rotor temperature reaches the steady operating level 170, the system reaches a dispatchable load level 172.

An operator desires to have the CC power generation system reach the dispatchable load level when the system is scheduled to deliver dispatchable power. The operator knows the current time, the ST rotor temperature at the current time and when the system is scheduled to deliver the dispatchable power. This information is inputted to the HMI tool which applies the algorithms disclosed herein to determine when to start at least the lead gas turbine (period A).

While only certain features of the invention have been illustrated and described herein, many modifications and changes will occur by those skilled in the art. It is, therefore, to be understood that the appended claims are intended to cover all such modifications and changes as they fall within the true spirit of the invention.

The invention claimed is:

1. A method for forecasting a start period for a combined cycle power generation system including a gas turbine engine, a steam turbine and a control system including having a user input and a display, the method comprising:
   a. determining a current turbine temperature of the steam turbine at a current time;
   b. determining a target time period to dispatchable load as a period from the current time to a target time at which the power generation system is to be at a predefined power output level;
   c. selecting a forecasted start time period as a period from the current time to a start time for a startup sequences of the power generation system;
   d. based on the forecasted start time period and the current turbine temperature, determining an estimated turbine starting temperature at the forecasted start time;
   e. using the estimated turbine starting temperature, determining an estimated time period for the startup sequence;
   f. summing the forecasted start time period and the estimated time period for the startup sequence to calculate a total time period;
   g. comparing the total time period to a target time period from a first time to the target time;
   h. using the forecasted start time period to determine when to start the startup sequence, if the comparison in step (g) determines the total time period to be within a predetermined period of the target time period, and
   i. decrementing the forecasted start time, if the comparison in step (g) indicates that the total time period is outside of the predetermined period of the target time period, and thereafter repeating steps (d) to (h).

2. The method of claim 1 wherein in step i steps d to h are repeated until the comparison determines the total time period is within the predetermined period of the target time period.

3. The method of claim 1 wherein in step i the forecasted start time period is decremented by an amount of time equal to the predetermined period in step h.

4. The method of claim 1 wherein the step d includes using an electronic model of a steam turbine which receives as inputs the current turbine temperature and a period between the current time and the forecasted start time, and outputs the estimated turbine starting temperature.

5. The method of claim 4 wherein the electronic model is a look-up table having data fields for turbine temperature correlated to times in a cool-down period of the turbine.

6. The method of claim 1 wherein the step e includes accessing a historical database of startup sequences for a generation system, and the database has data fields for turbine temperature correlated to times during a startup process.

7. The method of claim 1 wherein turbine temperature is a metal temperature of a rotor in the steam turbine.

8. The method of claim 1 wherein the predefined power output level is a dispatchable load power output level.

9. The method of claim 1 where the current time is a time at which a rotor metal temperature measurement was recently recorded.

10. A method for forecasting a start time for a combined cycle power generation system including a gas turbine engine (GT), at least one steam turbine (ST) and a controller having a user input and a display, the method comprising:
   a. entering into a control system a temperature of at least one of the steam turbines, wherein the temperature corresponds to a recent time;
   b. determining by the control system a target time period as a period from the recent time to a target time at which the power generation system is scheduled to be at a dispatchable load;
   c. selecting by the control system a forecasted start time period as a period from the recent time to a start of a startup sequence for the power generation system;
   d. based on the forecasted start time period and a first temperature, determining by the controller an estimated turbine temperature to occur at a forecasted start time;
   e. based on the estimated turbine temperature, determining by the controller an estimated time period for the startup sequence;
   f. summing by the controller the forecasted start time period and the estimated time period for the startup sequence and generating an estimated total time period from the recent time to the end of the startup sequence;
   g. comparing by the controller the estimated total time period and the target time period;
   h. the controller outputting the forecasted start time, if the controller in making the comparison determines the estimated total time period is within a predetermined period of the target time period, and
   i. decrementing by the controller the forecasted start time, if the controller determines that the estimated total time period is outside of the predetermined period of the target time period, and repeating steps d to h.

11. The method of claim 10 wherein in step i steps d to h are repeated until the comparison determines the estimated total time period is within the predetermined period of the target time period.

12. The method of claim 10 wherein in step i the forecasted start time period is decremented by an amount equal to the predetermined period.

13. The method of claim 10 wherein the step d includes using an electronic model of a steam turbine which receives as inputs the first temperature and a period between the first time and the forecasted start time, and outputs an estimated rotor temperature corresponding to the forecasted start time.

14. The method of claim 10 wherein the step e includes accessing a historical database of startup sequences having data fields for steam turbine rotor temperature correlated to times during a startup sequence.

15. The method of claim 10 wherein at least one steam turbine is a reheat steam turbine.

16. A control system for a combined cycle power generation system comprising a gas turbine and a steam turbine, the control system including a processor and an electronic memory storing a database of prior startup processes and a computer program for scheduling a start time for a future startup process, the program causing the processor to perform process steps comprising:
   a. entering as an input to the control system a current temperature of the steam turbine;
   b. determining by the control system a time period to dispatchable load period as a period from a current time to a target time at which the power generation system is scheduled to be at a dispatchable load;
   c. selecting a forecasted start time period as a period from a current time to a start of a startup process for the power generation system;
   d. based on the forecasted start time period and the current temperature of steam turbine, determining an estimated rotor temperature at a forecasted start time;
   e. based on the estimated rotor temperature, determining an estimated time period for a startup process which is a period initiated at the forecasted start time and ending when the power generation system reaches a predefined dispatchable load;
   f. summing the forecasted start time period and the estimated time period for the startup process to generate a total time to dispatchable load;
   g. comparing the total time to the dispatchable load to a time period from the current time to the target time;
   h. based on the forecasted start time period, determining when to start the startup process, if the processor in making the comparison determines the total time to dispatchable load to be within a predetermined period of the current time to the target time, and
   i. decrementing the forecasted start time by a predetermined period, if the processor determines in the comparison that the total time to dispatchable load is outside of the predetermined period of the current time to the target time, and repeating steps d to h.

17. The control system of claim 16 wherein the database includes data for temperatures of a rotor of the steam turbine at a start of each of a plurality of startup processes, and step e includes accessing the database using the estimated rotor temperature to identify one or more prior startup processes having a rotor temperature at the start of the startup process the same as or similar to the estimated rotor temperature, and using the identified one or more prior startup processes to determine the estimated time period for a startup process.

18. The control system of claim 16 wherein the gas turbine is a plurality of gas turbines and the steam turbine is a plurality of steam turbines, and wherein current temperature of the steam turbine is the current temperature of one of the plurality of steam turbines.

19. The control system of claim 16 wherein the steps d to h are repeated until the comparison determines the total time to dispatchable load is within the predetermined period of the current time to the target time.

20. The control system of claim 16 wherein the step d includes using an electronic model of a steam turbine which receives as inputs the current temperature and a period between the current time and the forecasted start time and outputs the estimated rotor temperature at the forecasted start time.

* * * * *

UNITED STATES PATENT AND TRADEMARK OFFICE
CERTIFICATE OF CORRECTION

| | | |
|---|---|---|
| PATENT NO. | : 8,195,339 B2 | Page 1 of 1 |
| APPLICATION NO. | : 12/565945 | |
| DATED | : June 5, 2012 | |
| INVENTOR(S) | : Long et al. | |

It is certified that error appears in the above-identified patent and that said Letters Patent is hereby corrected as shown below:

In the Specifications:

At column 11, line 40, delete "(a)" and insert --($\alpha$)--

Signed and Sealed this
Thirty-first Day of July, 2012

David J. Kappos
*Director of the United States Patent and Trademark Office*